D. R. HOWE.
PEAVY.
APPLICATION FILED JUNE 3, 1921.
1,414,878.
Patented May 2, 1922.
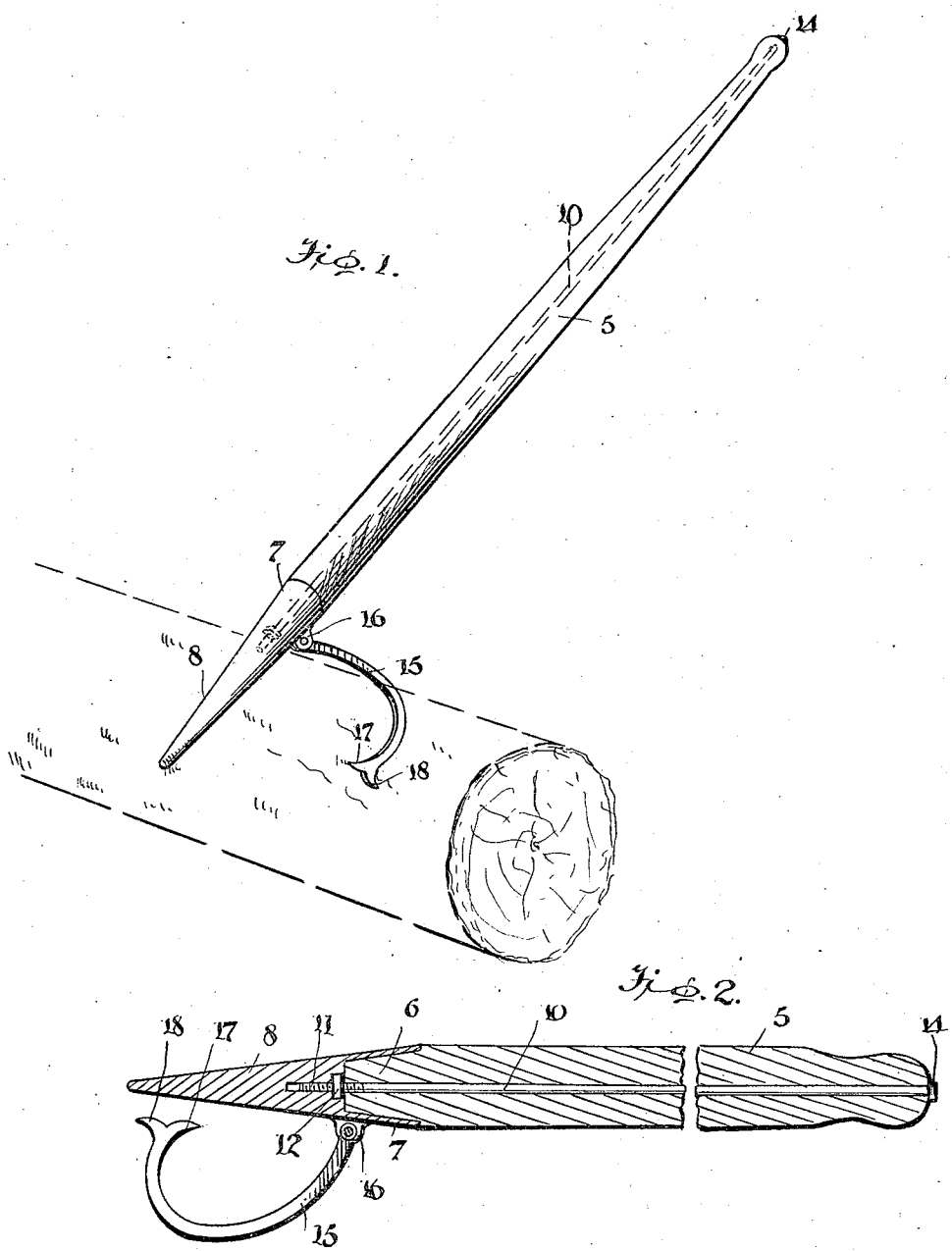
WITNESSES
INVENTOR
David R. Howe,
BY
ATTORNEYS

UNITED STATES PATENT OFFICE.

DAVID R. HOWE, OF ASHLAND, MAINE.

PEAVY.

1,414,878. Specification of Letters Patent. Patented May 2, 1922.

Application filed June 3, 1921. Serial No. 474,643.

*To all whom it may concern:*

Be it known that I, DAVID R. HOWE, a citizen of the United States, and resident of Ashland, in the county of Aroostook, in the State of Maine, have invented certain new and useful Improvements in Peavies, of which the following is a specification.

This invention relates to tools and more particularly to peavies employed in handling logs.

An important object of this invention is to provide a peavy having a reinforcing rod extended entirely through the same and secured to the head or pick so as to prevent the handle from breaking and also to prevent the accidental disconnection of the handle from the head or peavy.

Further the invention aims to provide a tool of the class described which is efficient, durable in use and cheap to manufacture.

Other objects and advantages of the invention will be apparent during the course of the following description.

Figure 1 is a perspective of the improved peavy.

Figure 2 is a detail longitudinal sectional view through the same.

In the drawing, wherein for the purpose of illustration is shown a preferred embodiment of the invention, the numeral 5 designates a handle which is of the usual construction and is preferably formed from wood. The forward end of the handle 5 is gradually reduced to form an attaching shank 6, snugly received within the gradually reduced socket 7 formed at the rear end of a cone-shaped head or pick 8.

The handle 5 is securely connected to the head or pick 8 by means of a reinforcing rod 10 extending longitudinally through the handle and threaded into the rear portion of the head as indicated at 11. The forward portion 11 of the rod 10 is also threaded into a nut 12 imbedded in the rear portion of the head. The reinforcing rod 10 which extends entirely through the handle 5 is formed at its rear end with a head 14 drawn into engagement with the rear end of the handle and having flat side faces adapted to be engaged by the jaws of a wrench, whereby the reinforcing rod may be rotated for tightening the same.

A hook 15 is pivoted to a pair of spaced parallel laterally projecting ears 16 formed on the side of the head 8 said hook being formed at its forward curved end with oppositely directed dogs 17 and 18, the dog 18 being self tripping.

In the use of the invention the handle 5 is securely connected to the head 8 and consequently the accidental loss or disconnection of the head from the handle is prevented. Also the rod 10 which prevents the loss of the head 8 reinforces and strengthens the handle so that the same is enabled to withstand the strain incident to use.

With reference to the foregoing description it will be apparent that a peavy constructed in accordance with this invention is enabled to withstand hard usage to which the same is subjected and also that the head is absolutely prevented from accidental disconnection from the handle.

Having thus described the invention what I claim is:—

1. A peavy comprising a handle, a head of cone-shaped formation having its rear portion formed with a socket receiving the forward portion of the handle, a reinforcing rod extending longitudinally through said handle and threaded into said head, and a hook pivotally connected to said head.

2. A peavy comprising a handle having its forward portion formed with a gradually reduced attaching shank, a head having its rear portion formed with a gradually reduced socket snugly receiving said attaching shank, the rear portion of said head being formed with a longitudinally extending screw threaded opening, and a reinforcing rod extending longitudinally through said handle and threaded into said threaded opening, said rod being extended entirely through said handle and having a head at the rear end of the handle.

3. A peavy comprising a handle having its forward portion formed with a gradually reduced attaching shank, a head having its rear portion formed with a gradually reduced socket snugly receiving said attaching shank, the rear portion of said head being formed with a longitudinally extending screw threaded opening, a reinforcing rod extending longitudinally through said handle and threaded into said threaded opening, said rod being extended entirely through said handle and having a head at the rear end of the handle, and a hook pivotally connected to said first named head and having oppositely directed dogs.

DAVID R. HOWE.